United States Patent
Rodriguez Alonso et al.

(10) Patent No.: US 9,050,837 B2
(45) Date of Patent: Jun. 9, 2015

(54) FILL-AND-LINE PRINT MODE

(75) Inventors: Raul Rodriguez Alonso, Sant Joan de Vilatorrada (ES); Sergio Puigardeu Aramendia, Barcelona (ES); Angel Martinez Barambio, Barcelona (ES)

(73) Assignee: Hewlett-Packard Development Company, L.P., Houston, TX (US)

( * ) Notice: Subject to any disclaimer, the term of this patent is extended or adjusted under 35 U.S.C. 154(b) by 778 days.

(21) Appl. No.: 12/787,614

(22) Filed: May 26, 2010

(65) Prior Publication Data

US 2011/0292104 A1    Dec. 1, 2011

(51) Int. Cl.
*B41J 2/21*     (2006.01)
*B41J 19/14*    (2006.01)
*G06K 15/10*    (2006.01)

(52) U.S. Cl.
CPC .............. *B41J 19/142* (2013.01); *B41J 2/2132* (2013.01); *G06K 15/107* (2013.01)

(58) Field of Classification Search
USPC ............... 347/5, 9, 14, 15, 41, 19, 38, 43
See application file for complete search history.

(56) References Cited

U.S. PATENT DOCUMENTS

| 6,270,185 B1 | 8/2001 | Askeland |
| 6,290,330 B1 | 9/2001 | Torpey et al. |
| 7,401,877 B2 | 7/2008 | Campbell et al. |
| 2005/0179916 A1 | 8/2005 | Mantell |
| 2009/0046119 A1* | 2/2009 | Edamura et al. ................ 347/15 |
| 2009/0135217 A1 | 5/2009 | Cardells et al. |

FOREIGN PATENT DOCUMENTS

JP    2003215864 A    7/2003

OTHER PUBLICATIONS

Hunt, Catherine B. et al., "High-Quality Inkjet Color Graphics Performance on Plain Paper", Hewlett-Packard Company, Feb. 1994, pp. 18-27.

* cited by examiner

*Primary Examiner* — Lam Nguyen
(74) *Attorney, Agent, or Firm* — Hewlett-Packard Patent Department

(57) ABSTRACT

An N-pass hybrid fill-and-line print mode is used to print an image on a print medium. In this mode, each sequence of N longitudinally overlapping printhead passes over said print media includes at least one transverse forward pass using a fill mask and at least one transverse reverse pass using a line mask.

17 Claims, 4 Drawing Sheets

2-PASS HYBRID MODE

3-PASS HYBRID MODE

5-PASS HYBRID MODE

6-PASS HYBRID MODE

FILL-AND-LINE PRINT MODE

BACKGROUND

Lines and fills can impose conflicting requirements on a printer. For example, small regular sub-pixel patterns, aka "masks", produce sharp lines (including text), while larger irregular sub-pixel masks produce smooth gradients for fills. Thus, different masks can be used depending on whether the print job predominantly involves lines or fills. Lines and fills can be effectively rendered using a high-quality print mode involving many passes per swath can be used, but at the cost of reduced throughput.

DETAILED DESCRIPTION

Figure 1:
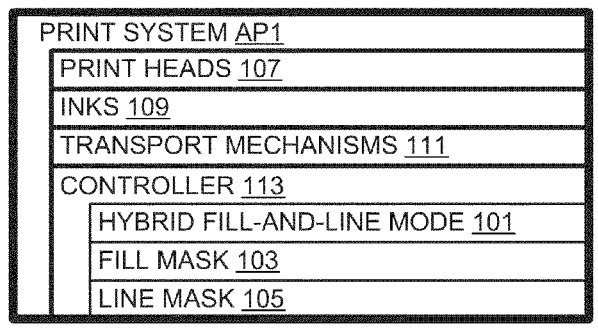
FIG. 1 is a schematic diagram of a print system in accordance with an embodiment.
Figure 2:
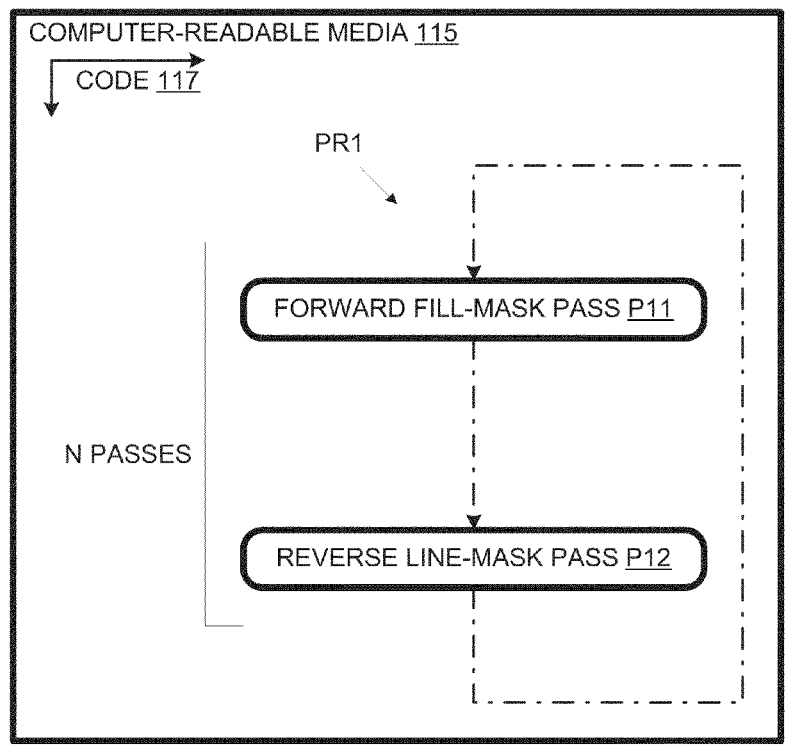
FIG. 2 is a flow chart of a method used in the print system of FIG. 1. Dashed arrows are used to allow for additional process segments for values of N greater than 2.

A print system AP1, shown in FIG. 1, employs a hybrid fill-and-line multi-pass print mode 101 to provide for high-throughput printing in which both lines and fills are reproduced effectively. For each swath, at least one forward pass uses a fill mask 103 and at least one reverse pass uses a line mask 105. Rather than alternate modes on a section-by-section basis, system AP1 provides every section with overlapping passes including at least one forward pass using a fill mask and at least one reverse pass using a line mask. Thus, even images having lines and fills that cannot be neatly segregated can be printed effectively using high-throughput print modes.

The overlapping passes can be implemented at different speeds. In general, higher quality can be achieved using slower speeds. However, the difference in quality is smaller for fills than it is for lines. For this reason, the fill passes can be implemented at higher speeds to improve throughput.

Print system AP1 includes printheads 107 for delivering selected colors of ink 109 to selected positions of a sheet 105 of print media. Print system AP1 includes transport mechanisms 111 for advancing a sheet of print media longitudinally relative to printheads 107 and for moving printheads 107 transversely (in forward and reverse directions) relative to the print medium. A controller 109 applies a fill-mask 111 when printing in a forward pass and applies a line mask 113 when printing in a reverse pass.

A controller 113 of print system AP1 provides for implementing hybrid fill-and-line print mode 101 so as to print an image on the print medium. To this end, controller 113 includes computer-readable storage media 115 encoded with code 117 configured (upon execution by a processor) to implement an N-pass hybrid fill-and-line print process PR1. Process PR1 includes a process segment P11 involving a forward pass using fill mask 103 and a process segment P12 involving a reverse pass using line mask 105.

Print system AP1 provides for various values of N, e.g., 2, 3, 4, 5, 6, and 7. At higher values of N, the hybrid fill/line approach yields diminishing returns. Nonetheless, some embodiments provide for hybrid print modes with eight and more passes per swath. For values of N>2, at least one and at most two employ the line mask, while most of the N passes use the fill mask. Typically, the passes using the fill mask are (at least on the average) faster than the passes using the line mask.

Figure 3:
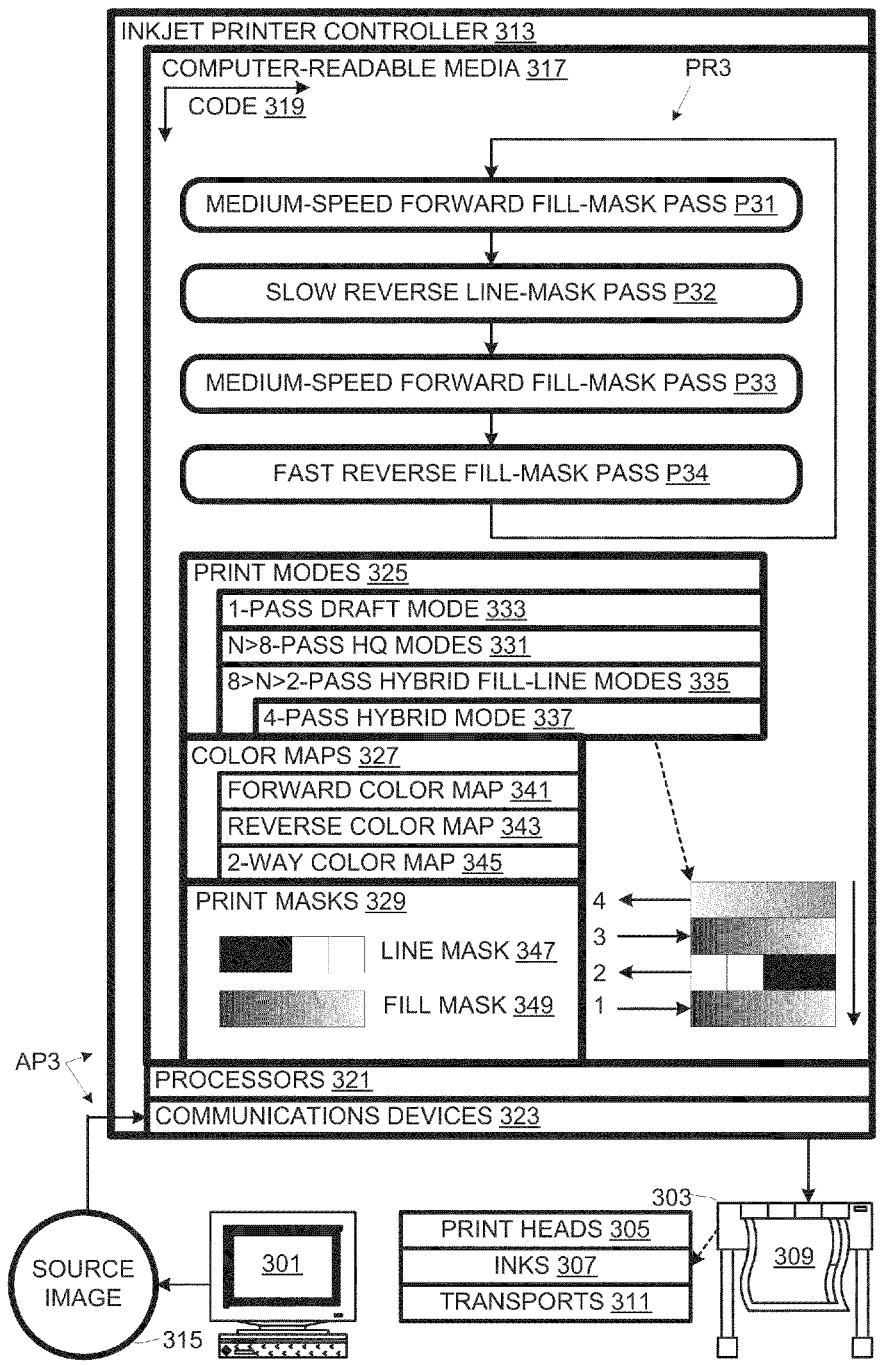
FIG. 3 is a schematic diagram of a print system in accordance with another embodiment.

As shown in FIG. 3, a print system AP3 includes a computer 301 and a printer 303. For example, printer 303 can be a large format inkjet printer/plotter. Printer AP3 includes printheads 305 for applying ink 307 to a sheet 309 of print media, e.g., paper. Printer AP3 includes transport mechanisms 311 for advancing media 309 longitudinally relative to printheads 305 and for moving printheads 305 transversely in forward and reverse directions relative to media 309.

Printheads 305 can be filled with different colors of ink, e.g., primary subtractive colors cyan, magenta, and yellow. In addition, inks of black and primary additive colors, red, green, and blue, can be used. Also, light and dark versions of a color can be included. Colors other than those of the employed inks can be attained by mixing inks or juxtaposing colors during printing.

Print system AP3 includes a controller 313 that receives a source image 315 from computer 301. Controller 313 converts source image 315 into a sequence of print commands that controls the placement of ink on sheet 309 by controlling transport mechanisms 311 and printheads 305. In an alternative embodiment, the controller is in the computer rather than in the printer. In another embodiment, the functions of a controller are distributed between a computer and a printer.

Controller 313 includes non-transitory tangible computer-readable storage media 317 encoded with code 319 defining programs and data, one or more hardware processors 321 for executing the programs, and communications devices 323 for communicating with external devices. Communications devices 323 can include a port for receiving a source image 315 and one or more ports communicatively coupled to transports 311 and printheads 305 respectively for control thereof.

Code 319 includes data defining print modes 325, color maps 327, and print masks 329. Print modes 325 provide for handling different types of print media and for different tradeoffs between print quality and print throughput. For example, print modes 325 can include various high-quality print modes 331, typically involving eight or more passes per swath (the longitudinal range coverable by ink in a single transverse printhead pass). In addition, print modes 325 can include one or more high-throughput draft modes involving a single pass per swath. Moreover, print modes 325 include one or more hybrid fill-and-line print modes 335, including a 4-pass hybrid mode 337 (to be described below in detail).

Each print mode 325 has an associated color map or pair of color maps selected from color maps 327. In some print modes, different color maps are used depending on the direction of a printhead pass across the print media. For example, forward color map 341 can be used during a forward pass and reverse color map 343. In some print modes, a single 2-way color map 345 is used in both directions. While three color maps are shown in FIG. 3, there can be different color maps for different media and print conditions. A color map or pair of color maps can be determined by printing on a sample sheet, using a spectrometer to determine the actual colors printed, and setting the color maps accordingly. Method for generating color maps are disclosed in U.S. Pat. No. 7,054,034 to Underwood et al., and in U.S. patent application Ser. No. 12/778,338 to Rodriguez et al.

Print masks 239 can include various print masks including a line mask 347 and a fill mask 349. Line masks tend to define a pattern that is used for each pixel. The pattern does not vary from pixel to pixel. Such a mask is well adapted to reproducing sharp transitions, e.g., between a line and its background. Fill masks define a color pattern that repeats every several, e.g. 4, pixels, rather than every pixel. The patterns are diffuse so as to reproduce gradients while minimizing banding artifacts. Fill masks and line masks are discussed in U.S. Patent Publication 2009/0135217 to Cardells et al.

Hybrid fill-and-line print modes 335 use both line mask 347 and fill mask 349. For example, 4-pass hybrid mode 337, graphically depicted at 350, implements a process PR3 defined by code 319 and flow charted in FIG. 3. Process segment P31 involves a first forward (e.g., left to right) pass at 30 inches per second (ips) using fill mask 349 and forward color map 341. Process segment P32 involves a second pass that proceeds in the reverse direction at 10 ips and uses line mask 347 and reverse color map 343. Process segment P33 involves a third pass in the forward direction at 30 ips using fill mask 349. Process segment P34 involves a fourth pass in the reverse direction at 50 ips using fill mask 349. In the illustrated embodiment, exactly one mask is used exclusively for each pass; in other words, fill mask 349 is not used in pass using line mask 347 and line mask 347 is not used in a pass using fill mask 349. Note that the average speed of the fill passes is greater than the average speed of the line passes.

For a 4-pass instance of process PR3, a quarter-swath print media advance is implemented after each of process segments P31-P34, which are iterated for as many swaths as are to be printed on sheet 309. More generally, a 1/N swath advance is made between passes for an N-pass print mode.

The first and third passes deposit 40% (30%-50%) each of the ink to be used for fills, while the fourth pass deposits the remaining 20% (10%-30%). Since about 80% of the fill ink is deposited using forward passes, hue shift is limited. For this reason, some embodiments forgo the use of different color maps respectively for the forward and reverse directions.

Figure 4:
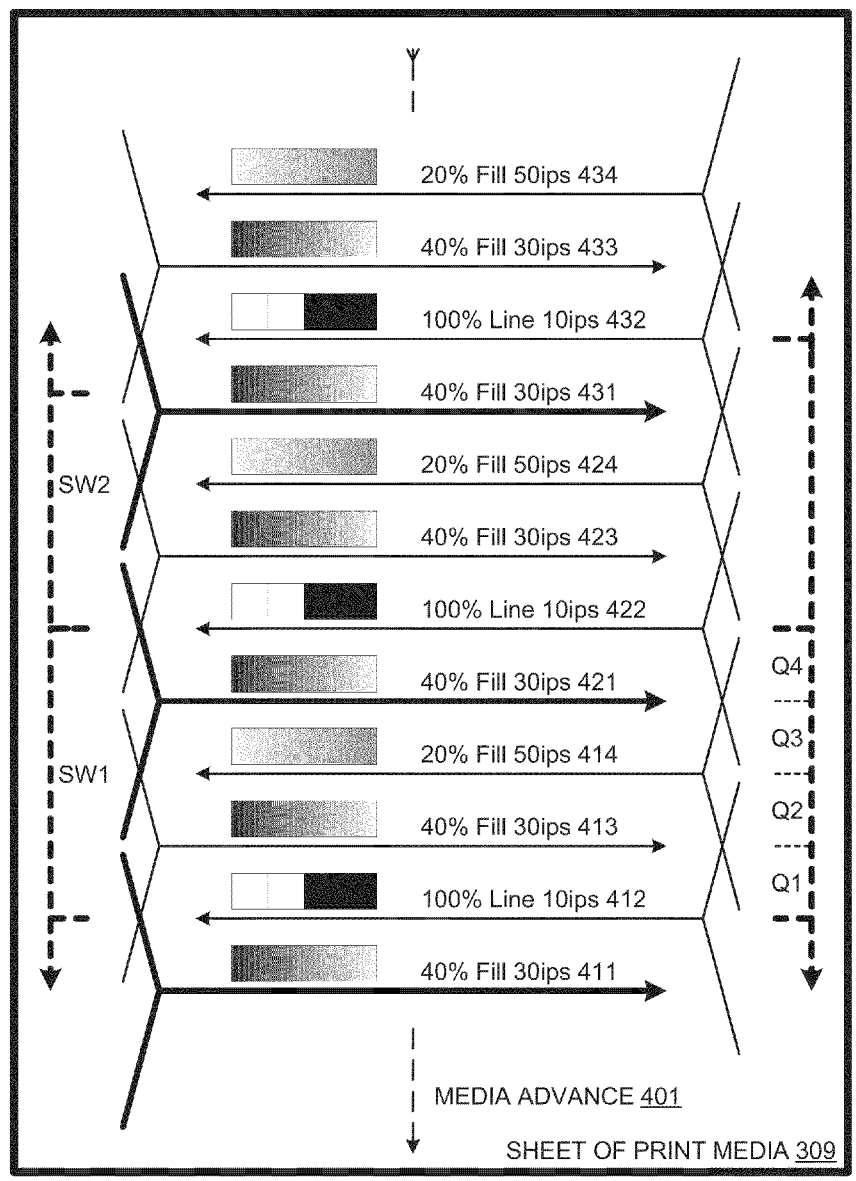
FIG. 4 is a schematic diagram of a 4-pass mixed fill-and-line print mode used in the context of the system of FIG. 3.

Process PR3 is explained in further detail with reference to FIG. 4. In practice, many swaths can fit on a page; FIG. 4 depicts a pair of consecutive swaths SW1 and SW2. Swath SW1 is shown divided into four quarters Q1-Q4. Sheet 309 is advanced in a longitudinal (e.g., downward in FIG. 4) direction as indicated at 401, so passes start at the bottom of FIG. 4 and progress upward.

Each pass 411-414, 421-424, and 431-434 is indicated by an arrow. For example, first pass 411 is shown as an arrow with a head and a large tail. The vertical dimension of the tail corresponds to the longitudinal extent over which ink can be printed in a single pass. The magnitude of this longitudinal extent corresponds to one swath. Passes 411, 415, and 419 are represented by heavier arrows than the other passes to demark the beginning of each 4-pass sequence.

First pass 411, which uses fill mask 347, covers quarter Q1 of swath SW1, but not quarters Q2-Q4, which are covered by first pass 421 of the next iteration of the 4-pass sequence. Second pass 412, which uses line mask 349, covers quarters Q1 and Q2 of swath SW1, but not quarters Q3 and Q4, which are covered by the second pass 422 of the next iteration of the 4-pass sequence. Third pass 413 covers quarters Q1-Q3, but not quarter Q4, which is covered by the third pass 423 of the next 4-pass sequence. Fourth pass 414 covers all four quarters Q1-Q4 of swath SW1.

Figure 5:
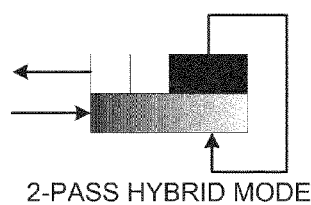
FIG. 5 is a schematic diagram of a 2-pass hybrid fill-and-line print mode used in the context of the system of FIG. 3.

FIG. 5 depicts a 2-pass hybrid fill-and-line print mode. Each two-pass sequence includes a forward pass using a fill mask and a reverse pass using a line mask. Variations include reversing the order of the forward and reverse passes and masks.

Figure 6:
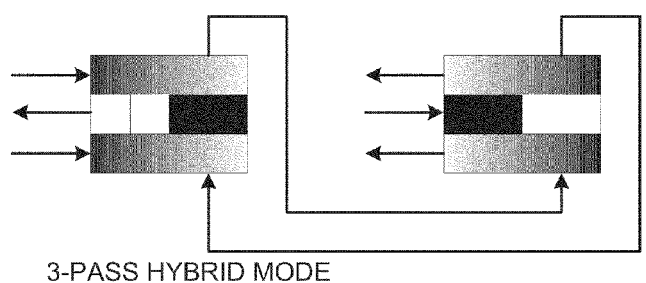
FIG. 6 is a schematic diagram of a 3-pass hybrid fill-and-line print mode used in the context of the system of FIG. 3.
Figure 7:
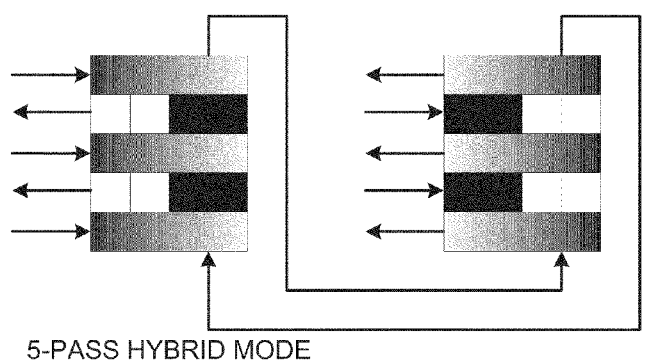
FIG. 7 is a schematic diagram of a 5-pass hybrid fill-and-line print mode used in the context of the system of FIG. 3.
Figure 8:
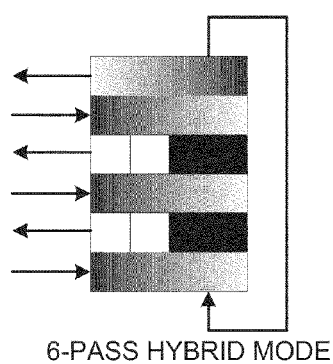
FIG. 8 is a schematic diagram of a 6-pass hybrid fill-and-line print mode used in the context of the system of FIG. 3.

FIG. 6 depicts a 3-pass hybrid fill-and-line print mode. The first 3-pass iteration involves 1) a forward pass using fill mask 349, 2) a reverse pass using line mask 347, and 3) a forward pass using fill mask 349. To avoid a time-consuming blank reverse run, the second iteration begins with a reverse-pass using a fill mask, followed by a forward pass using a line mask, ending with a reverses pass using a fill mask. The reversed relationship between iterations is characteristic of modes using an odd number of passes. For example, the 5-pass mode depicted in FIG. 7 also reverses directions for successive iterations of a 5-pass sequence. Using separate forward and reverse color maps can reduce any resulting hue shift. The 5-pass mode of FIG. 7 and a 6-pass mode of FIG. 8 each use a line mask for two passes in each sequence. The 6-pass mode uses line masks only for reverse passes.

The depicted hybrid print modes share the following characteristics. With each N-pass sequence, there is one or two passes that use line masks; these passes are in the same direction (in every sequence of N even and within a sequence for N odd). At least half the passes use a fill mask; for N greater than 3, the illustrated N-pass modes have at least one reverse pass in the reverse direction.

Herein "line mask" and "fill mask" are defined relative to each other in that the fill mask has a larger atomic (minimum repeatable) unit than does the corresponding line mask. Herein, "longitudinally" means in the direction that the print media is advanced relative to the printheads. Herein, "overlapping" refers to the longitudinal overlap in the printable areas printheads pass. Herein, "forward" and "reverse" are defined relative to each other to be opposing transverse directions, where "transverse" means "more orthogonal to than parallel to the longitudinal direction in which media is advanced; for example, "forward" can be "left-to-right" and "reverse" can mean "right-to-left" and vice versa.

Herein, "swath" is used in two related senses, which may be distinguished by context. In the primary sense, a swath is an area printed or printable during a single pass of one or more printheads. In the secondary sense, a page is divided into non-overlapping swaths, where the sections have the dimensions of a swath of the first sense. Herein, the phrase "of the ink to be applied" refers to ink to be applied to an area covered by a respective printhead pass.

Herein, "computer-readable storage media" and "print media" refer to non-transitory tangible media, e.g., magnetic and optical disk media as well as solid-state media, paper. Herein, "processor" refers to a device for executing computer-executable code. Such a processor includes metal for conducting electricity.

Herein, related art is discussed for expository purposes. In some cases, the related art may be prior art; in other cases, the related art may involve alternative approaches that could be taken, but that are not part of the prior art. Accordingly, related art labeled "prior art" is admitted prior art, and art not labeled "prior art" is not admitted prior art. The foregoing and other variations are defined by the following claims which are limited in scope to subject matter that is eligible under 35 USC 101. Any interpretation of the claims as relating to non-statutory subject matter is inconsistent with this specification.

What is claimed is:

1. A process comprising:
    selecting a line mask and a fill mask, wherein the line mask defines a pattern for a single pixel and wherein the fill mask defines a pattern that repeats across multiple pixels; and
    printing an image on a tangible print medium using an N-pass hybrid fill-and-line print mode in which a pixel position on a print medium is passed over by a sequence of N longitudinally overlapping printhead passes, each of the sequences including at least one transverse forward pass using a fill mask to print at least the pattern that repeats across multiple pixels and at least one transverse reverse pass using a line mask to print at least the pattern for the single pixel.

2. A process as recited in claim 1 wherein, for each sequence of N printhead passes, a number of passes using said fill mask exceeds a number of passes using said line mask.

3. A process as recited in claim 2 wherein each sequence of N printhead passes includes at least one reverse pass in which said fill mask is used.

4. A process as recited in claim 3 wherein N is four and exactly one of four passes in a 4-pass sequence uses said line mask.

5. A process as recited in claim 4 wherein:
    during a forward first pass using said fill mask, between 30% and 50% of the ink to be applied to fills is applied;
    during a reverse second pass said line mask is used;
    during a forward third pass using said fill mask, between 30% and 50% of the ink to be applied to fills is applied; and
    during a reverse fourth pass using said fill mask, between 10% and 30% of the ink to be applied to fills is applied.

6. A process as recited in claim 1 wherein an average speed of passes using said fill mask is greater than an average speed of passes using said line mask.

7. A print system comprising:
    one or more printheads for depositing ink to form an image on a tangible print medium;
    transport mechanisms for advancing said print medium longitudinally relative to said printheads and for moving said printheads in forward and reverse transverse passes across said print medium; and
    a controller for,
        selecting a line mask and a fill mask, wherein the line mask defines a pattern for a single pixel and wherein the fill mask defines a pattern that repeats across multiple pixels; and
        controlling said printheads and said transport mechanisms in accordance with an N-pass hybrid fill-and-line print mode in which each sequence of N passes includes at least one forward pass in which a fill mask is used to print at least the pattern that repeats across multiple pixels and at least one reverse pass in which a line mask is used to print at least the pattern for the single pixel, said line mask being different from said fill mask.

8. A print system as recited in claim 7 wherein, for each sequence of N printhead passes, a number of passes using said fill mask exceeds a number of passes using said line mask.

9. A print system as recited in claim 8 wherein each sequence of N printhead passes includes at least one reverse pass in which said fill mask is used.

10. A print system as recited in claim 9 wherein N is four, and exactly one of four passes in a 4-pass sequence uses said line mask.

11. A print system as recited in claim 10 wherein:
    during a forward first pass using said fill mask, between 30% and 50% of the ink to be applied to fills is applied;
    during a reverse second pass, said line mask is used;
    during a forward third pass using said fill mask, between 30% and 50% of the ink to be applied to fills is applied; and
    during a reverse fourth pass using said fill mask, between 10% and 30% of the ink to be applied to fills is applied.

12. A print system as recited in claim 7 wherein an average speed of passes using said fill mask is greater than an average speed of passes using said line mask.

13. A print system as recited in claim 7 wherein said controller includes a processor having metal for conducting electricity.

14. A product as recited in claim 7 wherein each sequence of N printhead passes includes at least one reverse pass in which said fill mask is used.

15. A product as recited in claim 14 wherein N is four and exactly one of four passes in a 4-pass sequence uses said line mask.

16. A computer product comprising computer-readable storage media encoded with code that, when executed by a processor, causes a print system to implement a process including:
    selecting a line mask and a fill mask, wherein the line mask defines a pattern for a single pixel and wherein the fill mask defines a pattern that repeats across multiple pixels; and
    depositing ink on a print medium using an N-pass hybrid line-and-fill print mode, wherein each sequence of N longitudinally overlapping passes includes at least one forward pass in which a fill mask is used to print at least the pattern that repeats across multiple pixels and at least one reverse pass in which a line mask is used to print at least the pattern for the single pixel.

17. A product as recited in claim 16 wherein, for each sequence of N printhead passes, a number of passes using said fill mask exceeds a number of passes using said line mask.

* * * * *